March 14, 1944.　　G. W. GOHRING　　2,344,141
BATTERY CARRIER
Filed June 30, 1941

G. W. Gohring   INVENTOR
BY
Merrill M. Blackburn.
ATTORNEY

Patented Mar. 14, 1944

2,344,141

UNITED STATES PATENT OFFICE 2,344,141

BATTERY CARRIER

George W. Gohring, Iowa City, Iowa

Application June 30, 1941, Serial No. 400,495

4 Claims. (Cl. 224—45)

The present invention relates to a carrier for carrying a storage battery, particularly for use as an auxiliary or booster battery, from one place to another, and the principal object of this invention is to furnish convenient means for transporting a storage battery and connecting cables from one location to another.

Among the objects of this invention are the provision of a carrier of the nature indicated which will be easy to manufacture and inexpensive; the provision of a carrier of the nature indicated which will have means for conveniently storing cables connected to the battery located in the carrier, said carrier being provided with means for preventing short-circuiting of the battery by the cable terminals coming into contact; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1:
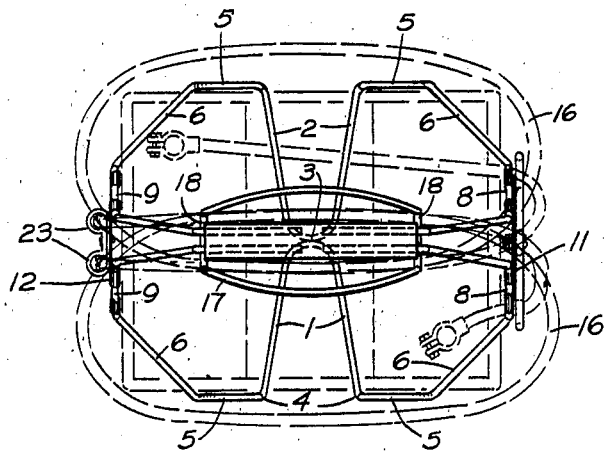
Fig. 1 represents a plan view of a carrier embodying my invention, a battery being shown therein by dotted lines to show how the battery is held in position by the carrier.

Reference will now be made in greater detail to the annexed drawing for a more complete description of this invention. As will be apparent from Fig. 1, a pair of similar members 1 and 2 are formed from heavy wire or rod-like members which are bent in more or less of zigzag form and provided centrally with large U-shaped loops, secured together at 3 by soldering, brazing, welding, or the like. At the outer ends of the arms of the loops 1 and 2, the wires are turned upwardly in arms 4 and then downwardly in slanting arms 5 to the horizontal, diagonally extending arms 6 which lie in the plane defined by the arms of the loops 1 and 2. These straight horizontal members furnish the supporting body for the battery which is placed thereon. Lateral motion with relation to this supporting body is prevented by means of the upstanding members 4 and 5.

Figure 2:
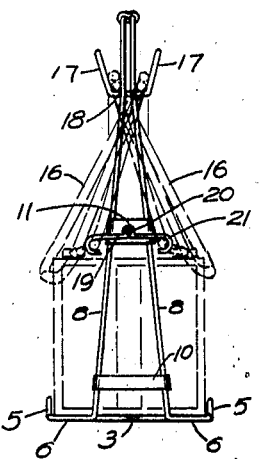
Fig. 2 represents an end view of the structure shown in Fig. 1.

Rising from the lateral ends of the diagonals 6 are the uprights 8 and 9, the uprights 8 being connected by cross-connectors 10 and 11, as shown most clearly in Fig. 2, and the uprights 9 being connected by cross-connectors 10 and 12, the connectors 12 being, in general, similar to the connectors 11. Somewhat above the connectors 11 and 12, the uprights 8 and 9 slope inwardly and upwardly, as shown at 13, and then extend directly upwardly, as indicated at 14. The inner ends of these wires extend substantially horizontally into the handle member 15. This handle member 15 is compressed vertically and into the space between the horizontal end portions of the wires so as to prevent undesired turning of the sleeve or handle member 15 with relation to these wires.

Figure 3:
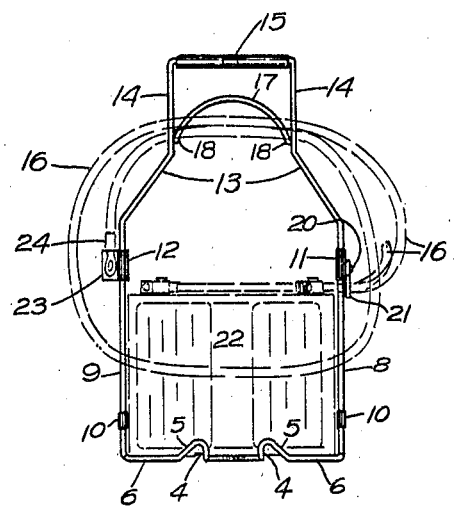
Fig. 3 represents a side view of this carrier, one of the cables being broken away to more clearly illustrate how the cables are arranged in order to prevent short-circuiting of the battery.

A support for the cables 16 is shown at 17. This is formed by bending a piece of heavy wire into a substantially circular loop having short, straight portions 18 upon opposite sides of the loop. The parts of the loop between these straight portions are then bent upwardly, as shown most clearly in Fig. 2. These upwardly extending portions incline outwardly somewhat, as indicated in this figure. It will therefore be seen that the cables 16 may be coiled up, as shown in Fig. 3, and hung in the hooks formed by the loops 17. The straight portions 18 are secured to the uprights 14 by soldering, brazing, or the like, and, therefore, besides serving to support the cables 16, they help to give rigidity to the upright portions of the supporting frame comprising the parts 8 to 14, inclusive.

Figure 4:
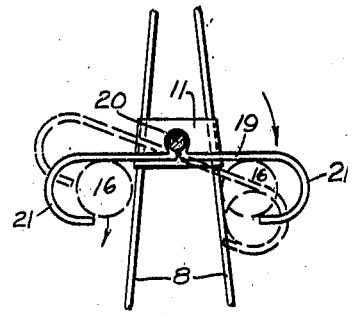
Fig. 4 represents an enlarged end view of a portion of the structure shown in Fig. 2.

A cable-holding bar 19 is pivotally supported at 20 upon the connector 11, this bar having its ends bent into hooks 21 for the reception of the cables 16. It is apparent that by rocking one end of this bar downwardly, as shown in Fig. 4, a cable 16 can be released from its hook 21, and then the bar 19 can be rocked in the opposite direction and the other cable 16 released. This is very convenient when it is desired to release the battery 22 for removal from the carrier.

Secured to the cross-connector or plate 12 upon the opposite side of the frame is an insulator having a pair of loops 23 into which may be inserted terminals 24 on the cables 16. These insulating loops, when the terminals 24 are inserted therein, tend to prevent short-circuiting of the battery.

Also, they help to hold the cables in place, thus keeping the entire assembly in handy, carrying condition.

When a battery has been carried to a location where it is desired to use current therefrom, the terminals 24 are removed from the insulating members 23 and attached to the electrical apparatus to which it is desired to furnish current. After a battery has been finished with, the cables are again coiled up and hung on the hooks 17, the terminals being inserted in the loops 23. One can now take hold of the handle 15 and easily walk away with the battery. It will be readily seen that, since the cables are securely held in place by the hooks 21 on the bar 19, there is very little danger of breaking the cables from the battery connectors, breaking the battery top, or having frayed cable coverings at the junction with the terminals since, in periods of non-use, the cables are normally supported on the hooks 17 and there is no tendency to try to pull the battery around by means of the cables since it is easier to take hold of the handle 15 and carry the battery to the location desired.

It will of course be understood that the specific description of structure set forth in this specification may be departed from without departing from the spirit of this invention as set forth in the annexed claims.

Having now described my invention, I claim:

1. A battery carrier comprising a supporting base portion, supporting uprights rising from said base portion and continuous therewith, at two opposite sides thereof, said uprights being connected together in pairs upon said opposite sides and said pairs being brought approximately together at their upper ends and bent toward each other to constitute a handle, a looped wire attached to and connecting said pairs of uprights intermediate their upper and lower extremities and extending laterally from its points of attachment to the uprights and then upwardly to form supports for battery cables, and retaining loops of insulating material attached to one pair of said uprights below said cable-supporting means and adapted to receive and hold the ends of said cables so that there may be no short-circuiting of the battery while being carried, there being connected to the other pair of uprights a pivoted bar having hooks at its ends to receive and hold in said hooks battery cables attached to a battery supported on said base.

2. A battery carrier constructed primarily from heavy wire bent into zig-zag forms and comprising a base portion upon which a battery may be mounted, said base portion having at its extreme lateral edges upwardly projecting loops to serve as battery retainers, the wires of the base portion being continued upwardly upon two other opposite sides of the battery, said wires being connected together in pairs upon said other opposite sides between the base portion and the upper end thereof, one of the connecting means having pivotally mounted thereon a crossbar provided at its ends with loops for the reception of cables attached to the battery so that said cables cannot be kinked adjacent the battery terminals, or be broken, or break the battery cover by reason of force exerted on the cables.

3. A battery carrier formed primarily from heavy wire bent to form a supporting base with the wires rising from two opposite sides thereof, said wires being brought together at their upper ends into a handle, and another wire bent into the form of a ring of which two opposite sides are bent upwardly into approximately parallel planes spaced some distance from each other, the upwardly bent portions constituting approximately semi-circular parts connected by substantially straight portions at the ends of the arcs, said straight portions being attached below the handle portions to the upwardly extending sides, said upwardly extending semi-circles constituting cable-supports upon which cables attached to the battery may be hung for carrying purposes, and being spaced laterally from the vertical plane of the handle and approximately parallel thereto.

4. A structure as defined by claim 3 having cross-members connecting adjacent upright wires to constitute stiffening means therefor, and loops mounted on one of the cross-members to receive the free end portions of battery cables attached to the battery, the cross-member on the other upright wires having pivotally mounted thereon a crossbar provided at its ends with hooks for the reception and positioning of cables attached to a battery positioned on the supporting base.

GEORGE W. GOHRING.